July 29, 1969 KANICHI TASHIMA 3,458,820

RECEIVING APPARATUS

Filed Sept. 12, 1966 2 Sheets-Sheet 1

United States Patent Office 3,458,820
Patented July 29, 1969

3,458,820

RECEIVING APPARATUS

Kanichi Tashima, Hirakata-shi, Japan, assignor to Matsushita Electric Industrial Co., Ltd., Osaka, Japan, a corporation of Japan Filed Sept. 12, 1966, Ser. No. 578,545
Claims priority, application Japan, Sept. 17, 1965, 40/57,604; Nov. 14, 1965, 40/68,005; Mar. 17, 1966, 41/17,059
Int. Cl. H04b *1/16*
U.S. Cl. 325—492 5 Claims

ABSTRACT OF THE DISCLOSURE

A receiving apparatus which employs, as a tuning element, a variable capacity element, varying in accordance with applied voltages or a variable inductance element varying in accordance with currents flowing therethrough. A bias voltage is provided for said tuning element by rectifying an oscillating voltage generated in a local oscillator. In this manner, the use of an AC-DC converter is unnecessary and therefore undesirable leakage flux derived from such a converter is eliminated.

This invention relates to a receiver which can receive automatically any electric waves by using a variable capacity element, the capacity thereof varying in accordance with applied voltages, or by using a variable inductance element, the inductance thereof varying in accordance with currents flowing therethrough, as a tuning element.

In the conventional art, in case said variable capacity element or said variable inductance element is used as a tuning element, a special constant voltage power source, besides an operating power source, is necessary to vary the capacity of said variable capacity element or the inductance of said variable inductance element in a predetermined manner.

According to the present invention, a special constant voltage power source, such as an AC-DC converter, is made unnecessary. In this invention a DC voltage, obtained by amplifying and rectifying a portion of an oscillating voltage, is superimposed upon a power source voltage so that the superimposed voltage may be applied to a variable capacity element or a variable inductance element.

Further, according to the present invention, it is not only possible to amplify, rectify and apply a part of the oscillating voltage generated in the oscillator circuit to the variable reactance element, but it is also possible to obtain a constant voltage circuit which is stable against temperature variation by providing a temperature compensating circuit, and accordingly it is also possible to obtain a stable oscillating characteristic at all times.

Further, according to the present invention, a receiver is so constructed that it can be operated by a low voltage power source by providing an oscillation driving apparatus in the oscillator circuit, and thus, a stable oscillating state can be maintained independent of the variation of the power source.

As is well known, a radio receiver comprises, generally, an antenna circuit which catches radio waves radiated from a broadcasting station, a frequency converter circuit to convert the caught signal frequency to a certain intermediate frequency, an intermediate frequency amplifier to amplify the signal, a detecting circuit to extract a voice signal, a low frequency amplifier to amplify said voice signal to a necessary degree, and a speaker. It also comprises a battery or a power circuit which rectifies the voltage of the house current lines. A radio receiver performs its functions only when those circuits operate accurately.

Generally, in a radio receiver, a variable condenser is used both in the antenna circuit and in an oscillator circuit to select radio signals among broadcasting stations, and a radio wave is selected by varying the capacities of the variable condensers by rotating the shafts of the condensers.

The present invention relates to a circuit arrangement of a radio receiver wherein a semi-conductor diode and a variable inductance element of which the inductance varies in accordance with the current flowing therethrough, is used instead of said variable condenser. A semi-conductor diode can be used as a variable capacity element in a radio receiver because it has a depletion layer between its P-N junction, thus constituting a capacity between the P-region and N-region, the value of which can be controlled by a DC bias voltage. Thus, by using a variable capacity diode, a receiving frequency can be varied electrically. Therefore, an extremely stable power source is required to obtain a DC bias voltage for applying to a variable capacity diode.

An object of the present invention is to provide a method for obtaining quite easily, an extremely stable power source at a low cost.

Generallly, in a radio receiver of the character wherein the receiving freqency is controlled by controlling the capacity of a variable capacity diode in accordance with the variation of the bias voltage, the under-mentioned three kinds of power sources are required. Firstly, a DC bias voltage, to be applied to said variable capacity diode; secondly, a bias voltage, to be applied across the collector and the base of a transistor for the local oscillator in a receiver; and thirdly, a power source for supplying voltages to other circuits. Only the third power source is required for a conventional radio receiver; however, the first and second power sources are also necessary, when said variable capacity diode is used as a tuning element. The necessity of the first power source is apparent from the above explanation. The necessity of the second power source will be understood by the following explanation.

The capacity of a variable capacity diode also varies in accordance with the oscillating voltage when it is used as a tuning element of a local oscillator. Thus, it is necessary to maintain the oscillating voltage constant because of the dependency of the oscillation frequency on the oscillating voltage. Accordingly, the bias voltage across the base and the collector of an oscillating transistor must be stabilized.

The three necessary power sources may be provided separately. However, three circuits may be supplied from a single power source. In the latter, a power source of a large capacity is needed, and its cost will be high. An object of the present invention is to provide a novel method for obtaining the above-described three power sources.

The present invention is described in the following specification taken together with the accompanying drawings, in which.

Figure 1:
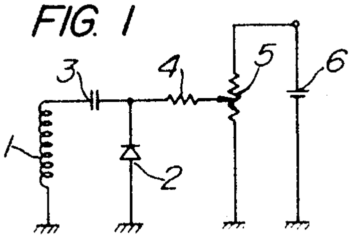
FIG. 1 shows a resonance circuit illustrating the principle of this invention.
Figure 2:
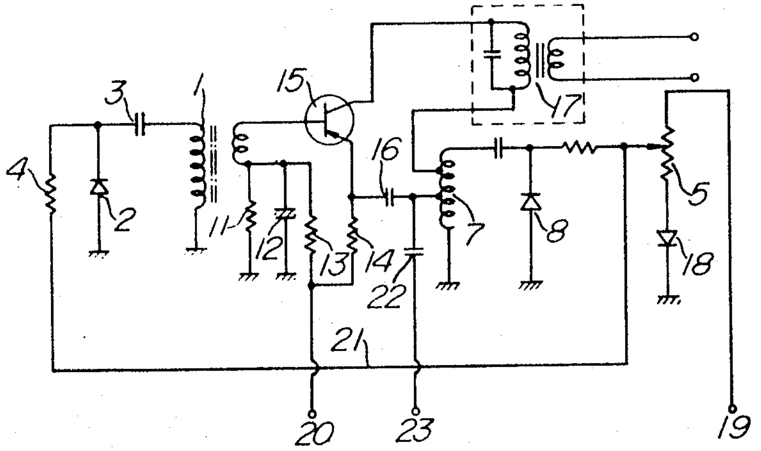
FIG. 2 shows a converter circuit wherein the resonance circuit shown in FIG. 1 is used.

In FIG. 1, the voltage from a power source 6 is applied to a resonance circuit, consisting of an antenna coil 1, a variable capacity diode 2, a coupling condenser 3 and a resistor 4. The voltage applied to the resonance circuit is adjusted by a variable resistance 5, to which the voltage of the power source 6 is also applied. In this case, the smaller the DC inverse bias voltage applied to the variable capacity diode 2, the larger the capacity and the lower the resonance frequency of the circuit. FIG. 2 shows a frequency converter circuit comprising an oscillating coil and a variable capacity diode for oscillation. In FIG. 2, reference numerals 11, 13 and 14 denote bias resistors for rendering a normal bias to an oscillating transistor 15, reference numeral 7 denotes an oscillating coil coupled to the transistor 15, numeral 8 denotes a variable capacity diode interconnected in the resonance circuit of the oscillating circuit, reference numeral 16 denotes a feedback capacity for oscillation, reference numeral 17 denotes an intermediate frequency transformer, reference numeral 18 denotes a temperature compensating diode which will be explained hereinafter, and reference numeral 12 denotes a condenser for starting oscillation, which will also be explained hereinafter. Reference numerals 19 and 20 are terminals of DC bias power sources for the oscillator circuit, numeral 19 being the terminal of a first power source for bias voltage for said variable capacity diode and numeral 20 being the terminal of a second power source for bias voltage across the base and the collector of an oscillating transistor. Reference numeral 22 denotes a coupling condenser, by which a part of the oscillating voltage of the oscillator circuit is applied through a lead wire 23 to an AC-DC converter circuit 30, in FIG. 5. Reference numeral 21 denotes a circuit for applying an equal bias voltage to both the variable capacity diodes in the antenna circuit and the oscillator circuit.

Figure 5:
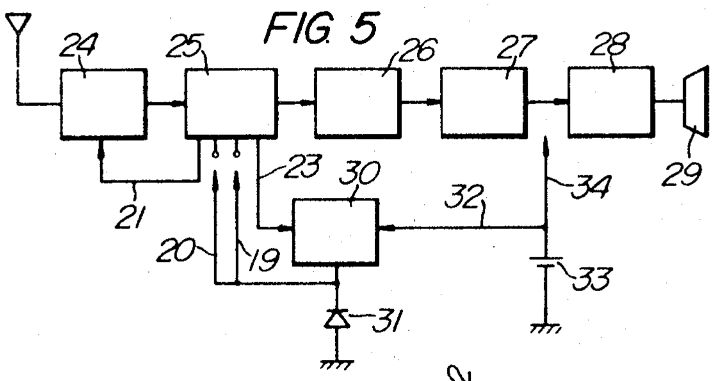
FIG. 5 is a block diagram, of the receiver wherein the circuits shown in FIGS. 1 to 4 are used.

In FIG. 5, the above-described converter circuits are represented by numerals 24 and 25. Reference numeral 26 denotes an intermediate frequency amplifier, reference numeral 27 denotes a detecting circuit, reference numeral 28 denotes an amplifier circuit, reference numeral 29 denotes a speaker, and reference numeral 30 denotes an AC-DC converter which amplifies and rectifies the voltage of the local oscillator circuit which is supplied from the lead wire 23. Reference numeral 31 denotes a constant voltage diode to stabilize the output DC voltage of the AC-DC converter circuit 30, the output thereof being applied to the first terminal 19 and the second terminal 20, and operating as the above-described first and second power sources. Reference numeral 33 denotes a third power source which supplies to all circuits through 32 and 34.

On the other hand, a conventional AC-DC transformer circuit, stabilized its output voltage by a stabilizing diode, can be used as a first and as a second power source in the radio receiver of this type. In this system, however, leakage of flux from the AC-DC transformer frequently occurs, and also the oscillating voltage signal frequently leaks. These flux leakages and voltage leakages are picked up by the antenna circuit. As the result, these interfering signals are converted into intermediate frequency by a converter circuit, are then detected, and thus noises appear in a speaker.

According to this invention, however, the disturbance waves which leak from the AC-DC converter 30 are of the same frequency as the local oscillation frequency and its higher harmonics. Accordingly, the disturbance waves are not converted into intermediate frequency by the converter circuit. Therefore, the leakage flux in this case does not render a disturbance.

In the circuit configuration of this invention, a part of the oscillating voltage of the local oscillator circuit is amplified and rectified, and the rectified DC voltage is superimposed upon the third power source. The superimposed voltage is stabilized by the constant voltage diode for use as the first and the second power sources.

The advantages of the system of this invention are as follows:

(a) The necessary power source for the over-all circuit is only the third power source 33, in other words, the first and the second power sources can be obtained from the AC-DC converter circuit 30 and the constant voltage diode 31.

(b) Since the AC-DC converter 30 is controlled by the local oscillating voltage, the frequencies of the flux or voltage which leak from this circuit 30 are the frequency of the local oscillating frequency and its higher harmonics. Therefore, no disturbance occurs in the antenna circuit.

(c) In the AC-DC converter 30, since an amplified and rectified voltage of the oscillating voltage, obtained in the local oscillator circuit, is superimposed upon the voltage of the third power source, the voltage of the third power source may be low.

The receiver of this invention provide a local oscillator circuit and an AC-DC converter circuit as explained above, and further provides a temperature compensating circuit.

Next, the diode 18 for temperature compensation will be explained. The terminal voltage of the constant voltage diode 31 rises slightly as the ambient temperature rises. On the other hand, the terminal voltage of the normal diode 18 decreases as the ambient temperature rises. Therefore, the variation of the bias voltage of variable capacity diode can be made zero at a certain point of the variable resistor. Assuming that the voltage of the diode 31 rises $\Delta V_z$ per 1° C. ambient temperature rise, and the voltage of the diode 18 decreases $\Delta V_d$ per 1° C. ambient temperature rise, then the variation of the bias voltage will be zero at the point where the condition $$P=\Delta V_d/(\Delta V_z+\Delta V_d)$$

is satisfied. P is the ratio of the resistance between the diode 18 side and the movable terminal 56 to the total resistance of the variable resistor. Thus, by inserting the diode 18 in series with the variable resistor 5, the DC bias voltage to be applied to the variable capacity diodes 2 and 8 can be stabilized against temperature. Further, a thermo-sensitive resistance, such as a thermistor, of which the resistance varies in accordance with temperature, may be used instead of the diode 18, to the similar effect.

Further, the receiver of this invention is constructed to be able to operate with a low voltage power source by providing an oscillation driving apparatus in the oscillator circuit and accordingly can maintain a stable oscillating state independent of the variation of the voltage of the power source.

Figure 3:
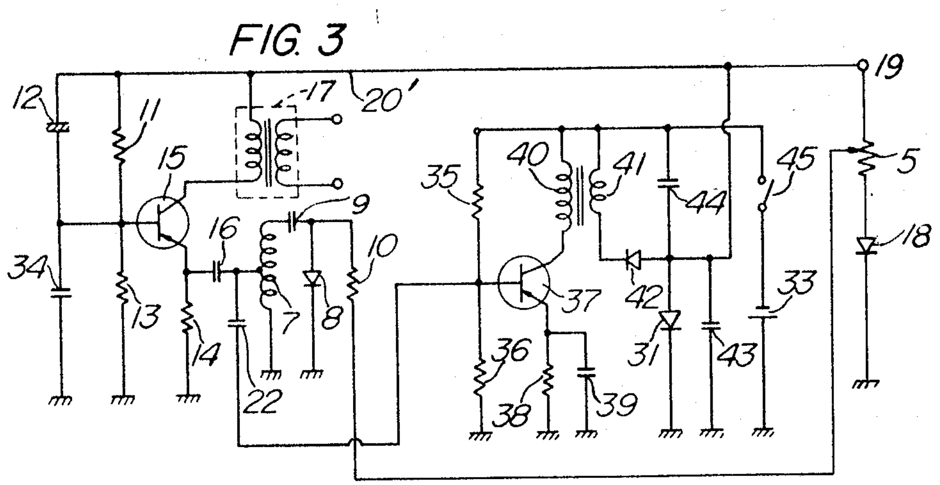
FIG. 3 is a circuit diagram wherein a temperature-compensating circuit is provided to the converter circuit illustrated in FIG. 2.

One embodiment of the invention will be explained hereinafter. FIG. 3 shows a circuit wherein a circuit including a transistor 37 is added to the circuit shown in FIG. 2. In FIG. 3, the grounding method is reversed from that shown in FIG. 2; however, the same reference numerals are attached to the parts similar to those of FIG. 2.

Figure 4:
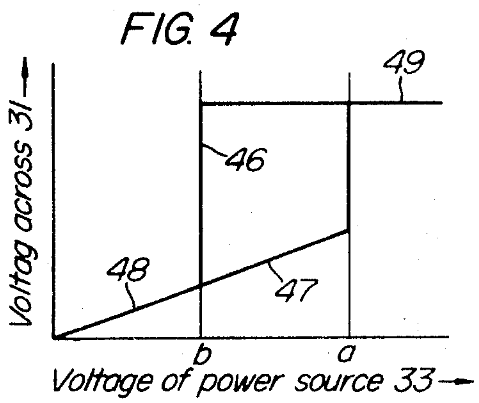
FIG. 4 shows characteristic curves of the local oscillator circuit illustrated in FIGS. 2 and 3.

In FIG. 3, reference numeral 12 denotes an oscillation starting condenser and reference numeral 34 denotes a bias condenser. A transistor 37 amplifies a part of the oscillating voltage, and the amplified voltage is applied to transformer windings 40 and 41, the output voltage of which is rectified by a rectifier circuit comprising a diode 42 and a condenser 44, and is then stabilized by a constant voltage diode 31. This voltage is used as a secondary power source, and is applied to a converter circuit as a bias voltage. Reference numerals 35, 36 and 38 denote bias resistors and reference numeral 39 denotes a bias condenser. Elements 35, 36, 38 and 39 are provided to operate the transistor 37. Reference numeral 43 denotes a bias condenser. In general, it is well known that a transistor oscillator circuit does not operate unless a bias current which corresponds to a voltage higher than a certain voltage is supplied. The value of the certain voltage will be called the oscillation starting voltage. A condenser 12 is connected across the collector and the base of a transistor 15 to increase the base voltage and the collector current of the transistor 15 when a switch 45 is closed. In case the condenser 12 is not inserted, the base bias voltage of the transistor 15, determined by the resistors 11 and 13, is lower than that appearing in the case when the condenser 12 is inserted. In this manner, the oscillator circuit begins to oscillate at a voltage lower than that indicated at *a* in FIG. 4. By connecting the condenser 12 as shown in FIG. 3, the voltage across the condenser 12 becomes zero when the switch 45 is closed, and accordingly the bias voltage of the transistor 15 is very high at that time. Therefore, the oscillation will start easily at a remarkably lower voltage of the power source 33, at which voltage the oscillation does not start without the condenser 12. The point *b* in FIG. 4 shows this fact. As the result of our experiments, the oscillation starting voltage is 7.5 v. in case the condenser 12 is not connected, and is 3.9 v. in case the condenser 12 is connected.

Figure 6:
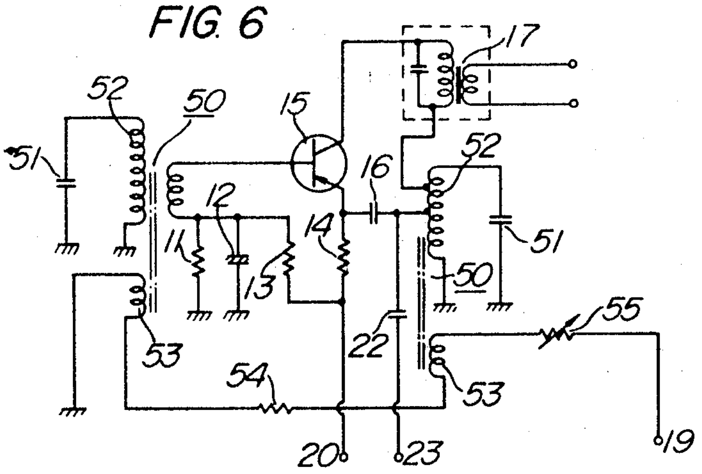
FIG. 6 is a circuit diagram of another embodiment of this invention showing a converter circuit wherein a variable inductance element is used.

In the above description, a circuit configuration is explained wherein a semi-conductor variable capacity diode, the capacity of which varies in accordance with the voltage applied thereto, is used as a resonance element, and a constant bias voltage is applied to said diode. However, a variable inductance element, the inductance of which varies in accordance with current can be used instead of said variable capacity element. FIG. 6 shows a circuit wherein variable inductance elements are used. In FIG. 6, the same reference numerals are attached to the parts similar to those in FIG. 2. In FIG. 6, a variable inductance element is used both in the antenna circuit and in the oscillator circuit.

Figure 7:
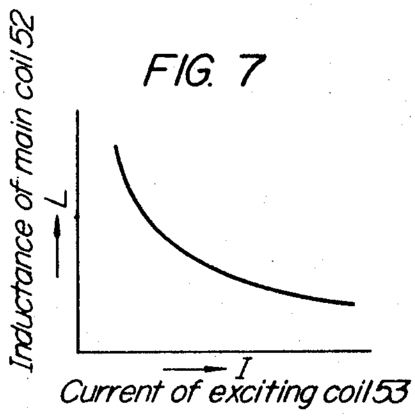
FIG. 7 is a characteristic curve of a variable inductance element.

Both the antenna circuit and the oscillator circuit comprise a variable inductance element 50 and a condenser 51. Each of the variable inductance elements 50 is provided with a main coil 52 connected in parallel with the condenser 51 and an exciting coil 53 which is magnetically coupled with the main coil 52. The exciting coil 53 for the oscillator circuit and for the antenna circuit are connected in series through a resistor 54, and the exciting coil 53 for the oscillator circuit is connected to the terminal 19 of the DC bias power source through a variable resistor 55. When the current flowing through the exciting coil 53 in both the oscillator circuit and the antenna circuit is successively increased, as shown in FIG. 7, by adjusting the variable resistor 55, the inductances of both main coil 52 decrease successively owing to their magnetic saturation. By this circuit configuration, of course, the same effect is obtained as when the semi-conductor diode, the capacity of which varies in accordance with the voltage, is used.

The circuits illustrated for explanation are only embodiments of this invention, and various modifications, especially of the rectifier circuit, and so on, can be made. By using any of such modifications, the effect of this invention can be obtained. For example, a transistor may be substituted by any other amplifier element, and the oscillator circuit may be of any type other than the embodiments as above-explained.

As described above, according to this invention, a stable bias power source can be obtained by a simple method.

What is claimed is:

1. A receiver wherein a variable reactance element, the reactance of which varies in accordance with the voltage or current applied thereto, is used both in an oscillator circuit and in an antenna circuit, and a part of the oscillating voltage of a local oscillator circuit is amplified and rectified, said amplified and rectified DC voltage being applied to said variable reactance element and an oscillating transistor as respective bias voltage.

2. A receiver according to claim 1, wherein said variable reactance element is a variable capacity element.

3. A receiver according to claim 1, wherein said variable reactance element is variable inductance element.

4. A receiver according to claim 1, wherein a variable capacity diode is used as said variable reactance element and a semi-conductor diode, to which a forward bias voltage is applied and connected in series with a resistor, is connected in parallel with said variable capacity diode.

5. A receiver according to claim 1, wherein said bias voltage of said oscillator circuit is increased instantaneously, upon application of voltage of power source, by inserting a condenser of large capacity between the collector and the base of said transistor.

References Cited

UNITED STATES PATENTS

| | | | |
|---|---|---|---|
| 3,095,533 | 6/1963 | Keizer | 334—15 X |
| 3,109,995 | 11/1963 | Wargo | 331—117 |

OTHER REFERENCES

"Detuning and Temperature Compensation of the Varactron Diode," Application Notes, Crystalonics, Inc., Cambridge, Mass. September 1965.

KATHLEEN H. CLAFFY, Primary Examiner

D. L. RAY, Assistant Examiner